United States Patent
Laing et al.

(10) Patent No.: US 6,622,930 B2
(45) Date of Patent: Sep. 23, 2003

(54) FREEZE PROTECTION FOR HOT WATER SYSTEMS

(76) Inventors: Karsten Andreas Laing, 1253 La Jolla Rancho Rd., La Jolla, CA (US) 92037; Johannes Nikolaus Laing, 1253 La Jolla Rancho Rd., La Jolla, CA (US) 92037

( * ) Notice: Subject to any disclaimer, the term of this patent is extended or adjusted under 35 U.S.C. 154(b) by 45 days.

(21) Appl. No.: 10/054,457

(22) Filed: Jan. 24, 2002

(65) Prior Publication Data

US 2002/0113134 A1 Aug. 22, 2002

(51) Int. Cl.[7] .............................................. E03B 7/10
(52) U.S. Cl. ..................................... 237/80; 137/59
(58) Field of Search .......................... 237/80, 62, 16, 237/19, 2 R, 2 A; 137/59

(56) References Cited

U.S. PATENT DOCUMENTS

| | | | | |
|---|---|---|---|---|
| 4,457,326 A | * | 7/1984 | Donnelly | 137/59 |
| 4,672,990 A | * | 6/1987 | Robillard | 137/59 |
| 4,750,472 A | * | 6/1988 | Fazekas | 122/13.3 |
| 5,220,937 A | * | 6/1993 | Roberts et al. | 137/62 |
| 5,240,179 A | * | 8/1993 | Drinkwater | 237/80 |
| 5,643,482 A | * | 7/1997 | Sandelman et al. | 219/497 |
| 6,196,246 B1 | * | 3/2001 | Folsom | 137/2 |

* cited by examiner

*Primary Examiner*—Derek Boles

(57) ABSTRACT

In installations with water circuits such as domestic hot water or hydronic heating circuits a circulator pump is connected with a temperature sensor which energizes the pump as soon as the temperature of the water in the system falls below a predetermined temperature close to freezing.

4 Claims, 1 Drawing Sheet

FREEZE PROTECTION FOR HOT WATER SYSTEMS

FIELD OF THE INVENTION

The invention refers to the protection of piping systems containing water from damages due to freezing.

PRIOR ART

During vacation time in winter or in holiday resorts there is a necessity to protect the domestic water installation and also the hydronic heating system from freezing. Known are heating cables, which are in heat conducting contact with the pipes, however, it is difficult or even impossible to apply it to existing installations. Usually the hydronic heating is kept working at a reduced temperature, which means unnecessary energy consumption. It is also possible to fill the hydronic system with a mixture of water and the expensive glycol, which requires a higher velocity of flow within the pipes than with water.

SUMMARY OF THE INVENTION

The invention shows a way to avoid these disadvantages. The invention takes advantage of the fact that the surface of the pipes is much smaller than the surface of the radiators and that in the beginning only such pipe sections tend to freeze, which are exposed to draft, while the water in all other pipes and especially in the hot water tank still has a temperature above the freezing point. According to the invention a connecting pipe with a circulator pump is arranged at the end of the distribution lines between the hot water pipes and the cold water pipes, whereby the circulator pump is switched on by a thermostat as soon as the room temperature falls below a preset temperature, for instance 4° C. In domestic hot water systems with a storage tank the water temperature stays above the freezing point for several days. For longer periods of cold weather and also for installations without a tank, a resistance heater, which forms a unit with the circulator pump, will be provided. In installations with a hot water recirculation pump no additional pump will be needed. If a circulator pump conveys the cooled down water through a circulation pipe back into the hot water tank, a connection with a valve between the outlet port of the pump and the cold water line is necessary which prevents that cold water flows into the hot water system. In installations in which the cooled down content of the hot water pipes is conveyed back into the cold water pipe, only a room-thermostat will be necessary which turns on the pump as soon as the room temperature falls below for instance 4° C. (39.2° F). In installations with a microprocessor, the program of the processor will activate the pump in case of freezing danger.

The invention can not only be used in domestic hot water systems but also in hydronic heating systems. In this case the heating circulator can be used. As soon as the room temperature falls below for instance 4° C., a thermo-switch activates the circulator pump once or twice per hour for as long as it takes to circulate the whole content of the water in the heating circuits approximately two times. As soon as the water temperature falls below 2° C., a second thermostat activates a heating element for instance a heating wire wound around one of the pipes and sets the pump to run continuously. Also in hydronic systems a resistance heater of low performance is advantageous.

DETAILED DESCRIPTION OF THE DRAWINGS

Figure 1:
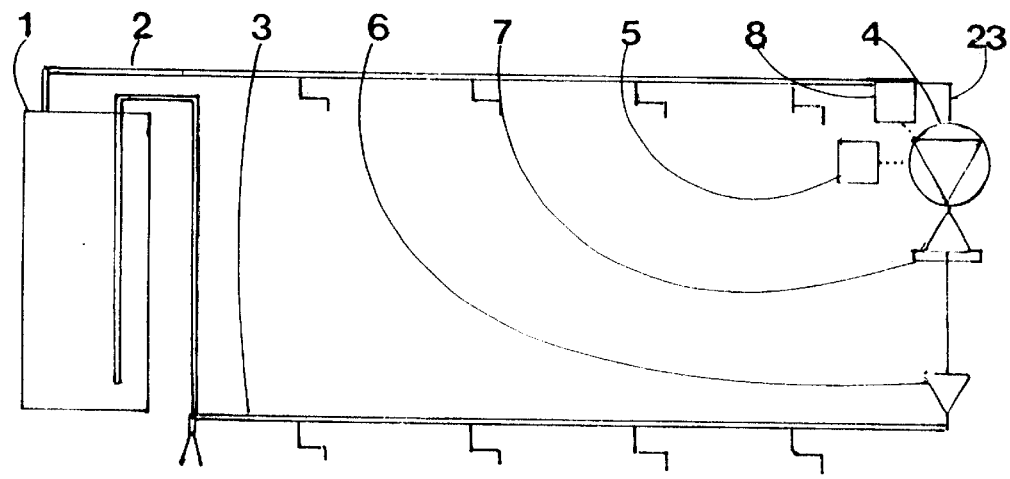
FIG. 1 shows an installation with a hot water heater.
Figure 2:
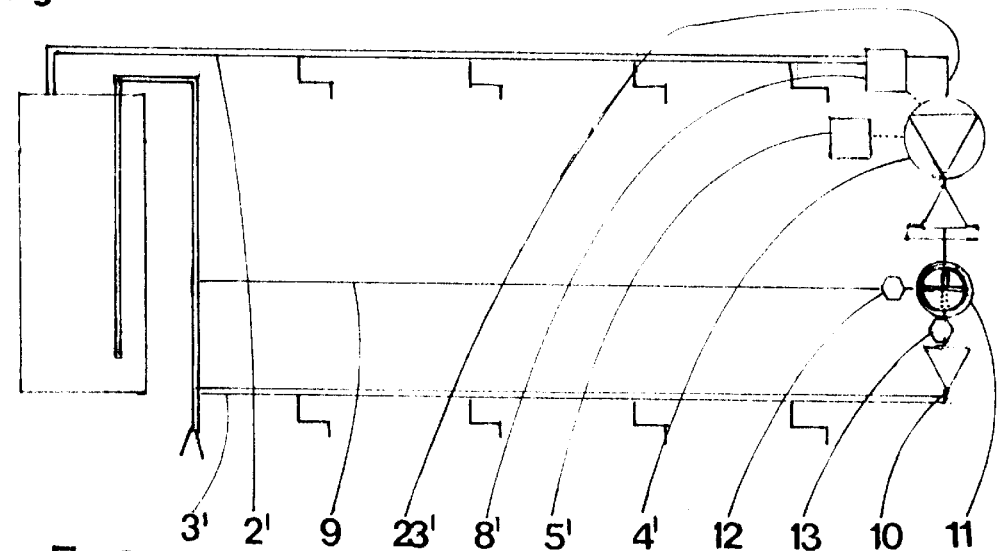
FIG. 2 shows an installation with a recirculation line to the hot water heater.
Figure 3:
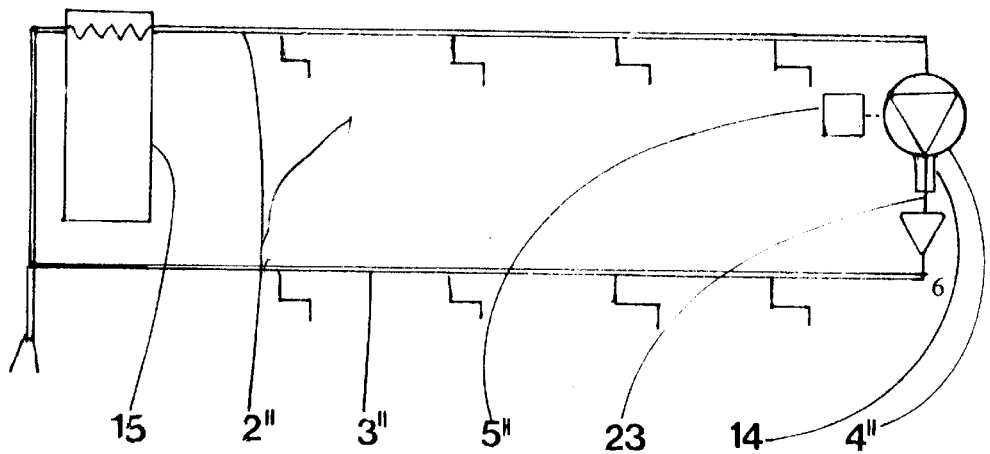
FIG. 3 shows an Installation with an instant gas-heater.

FIG. 1 shows an installation with a hot water heater 1, a hot water pipe 2 and a cold water pipe 3. At the end of both lines 2 and 3 a pipe 23 connects the suction port of a small circulator pump 4 with the hot water pipe 2 and the pressure side with the cold water line 3. A temperature switch 5 activates the circulator pump 4 when the room temperature comes close to the freezing point. A check valve 6 prevents cold water from entering the hot water line 2 and a second check valve 7 prevents warm water from entering the cold water line. This valve 7, which is described in patent EP 07751355 A1, opens hydraulically as soon as the pump impeller creates pressure. With a second temperature switch 8 the same circulator pump 4 can be used as pump for the hot water circulation whereby the temperature switch 8 measures the temperature of the water in the hot water line and as soon as the temperature falls below a preset temperature, pump 4 is activated which then conveys the cooled down water content of the hot water line 2 into the cold water line 3. As soon as the hot water heater is switched off, temperature switch 5 interrupts the power supply when the water temperature in the hot water line 2 falls by a predetermined value, for instance 10K, below the activation temperature of the temperature switch 8 and activates the circulator pump 4 as soon as the room temperature falls below for instance 4° C. or when the water temperature exceeds for the first time the activation temperature of temperature switch 8 when the hot water heater is switched on again. FIG. 2 shows an installation with a recirculation line 9. In order to get a circulation there has to be a connection 10 with the cold water line 3', which can be achieved by a three-way-valve 11, which In its position with a connection to the cold water line does not totally block the connection through the circulation line 9 so that a small conveyance continues through recirculation line 9. Attentively check valves 12 and 13 can also perform the changeover. Also room temperature-controlled solenoid valves or other temperature controlled valves can make the connection to the cold water line when there is danger of freezing. FIG. 3 shows the diagram for units with instant gas-water-heaters 15, a connection line 23 and circulator pump 4". As soon as the room temperature falls below for instance 4° C., temperature switch 5" activates pump 4" and, as soon as the water temperature falls below for instance 2° C., it also energizes an electric resistor heating element 14. The water than flows through the pipe 3" on the pressure side, thereafter through the heat exchanger of the instant water heater 15 and then through the pipe 2" to the suction side of pump 40".

We claim:

1. Installation to prevent damage by freezing to hot or cold water pipes of a hot- and cold-water distribution system, characterized by a pipe (23) and a circulator pump (4) at the end of a hot water pipe (2) and a connection between the pressure side of circulator pump (4) and cold water pipe (3), the circulator pump (4) being energized by a temperature sensor (5) as soon as the temperature reaches a predetermined value near freezing and a check-valve between the pressure side of the pump and the cold water line and that in series with the check valve a hydraulically operated check valve which allows flow in the opposite direction of the check valve is arranged which will be opened by the pressure of pump and the pressure side of the pump contains a three-way valve and a re-circulation line.

2. Installation according to claim 1 to prevent damage by freezing to hot or cold water pipes of a hot- and cold-water distribution system, characterized by a gas-fired instant hot water heater (15), a hot water line (2") and a cold water line (3") and at the end of these two water lines (2" and 3") a circulator pump (4") and a check valve between said lines (2" and 3") comprising a resistor heating element (14), which is energized by a thermostat (5") if the temperature falls below a predetermined temperature close to the freezing point.

3. Installation according to claim 1 to prevent freezing of the water hydronic heating systems comprising means to circulate the water content of the pipes if the temperature falls below a predetermined temperature close to freezing.

4. Installation according to claim 3, characterized in that the circulation is achieved by a circulator pump controlled by a thermostat which activates the pump at a predetermined temperature close to freezing, which circulator pump is considerably smaller than the circulator pump for water circulation during hydronic heating.

* * * * *